April 9, 1929.  H. A. BROWN  1,708,691
REMOTE CONTROL CIRCUIT CHANGER
Filed July 14, 1926   2 Sheets-Sheet 1
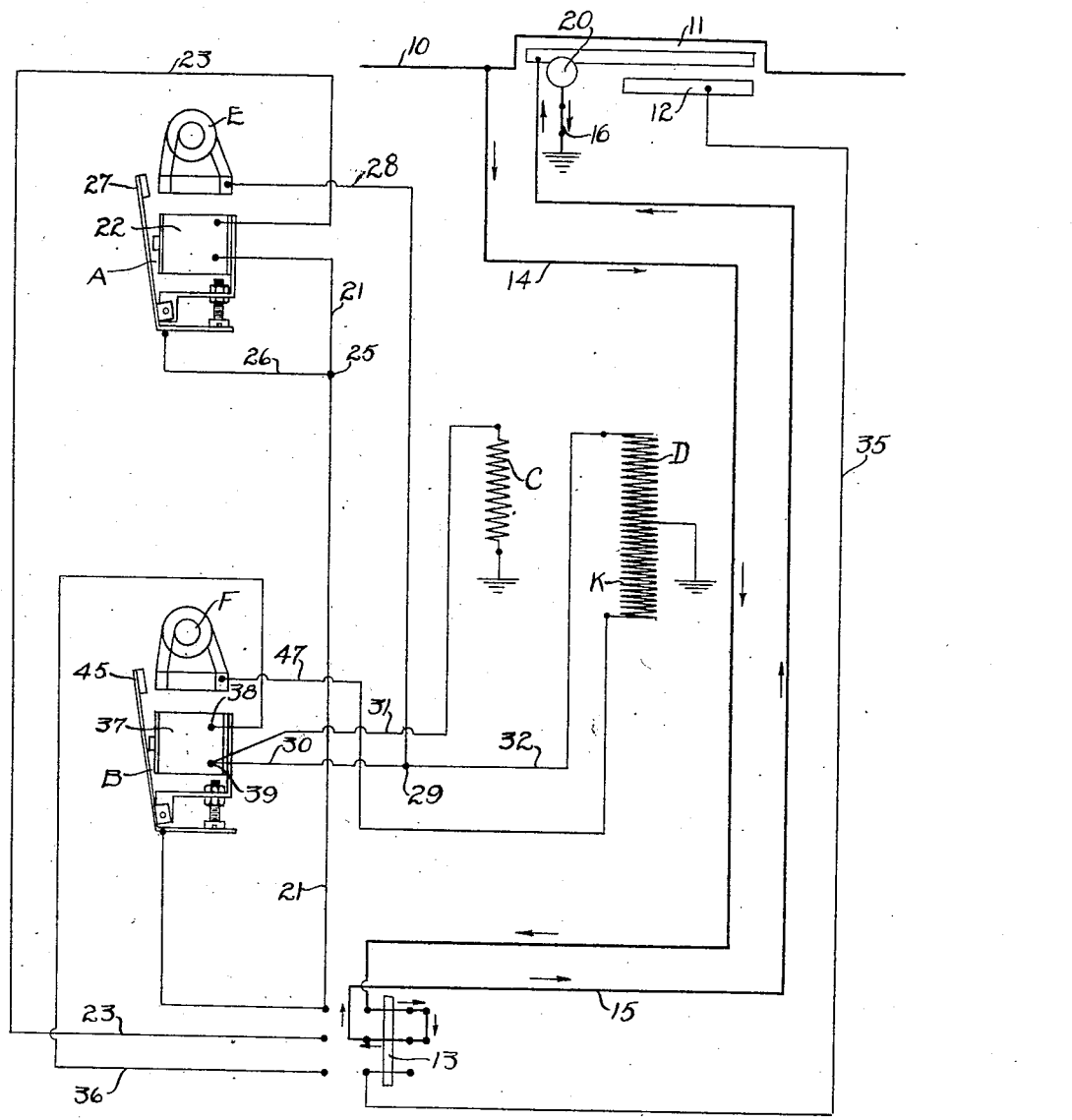

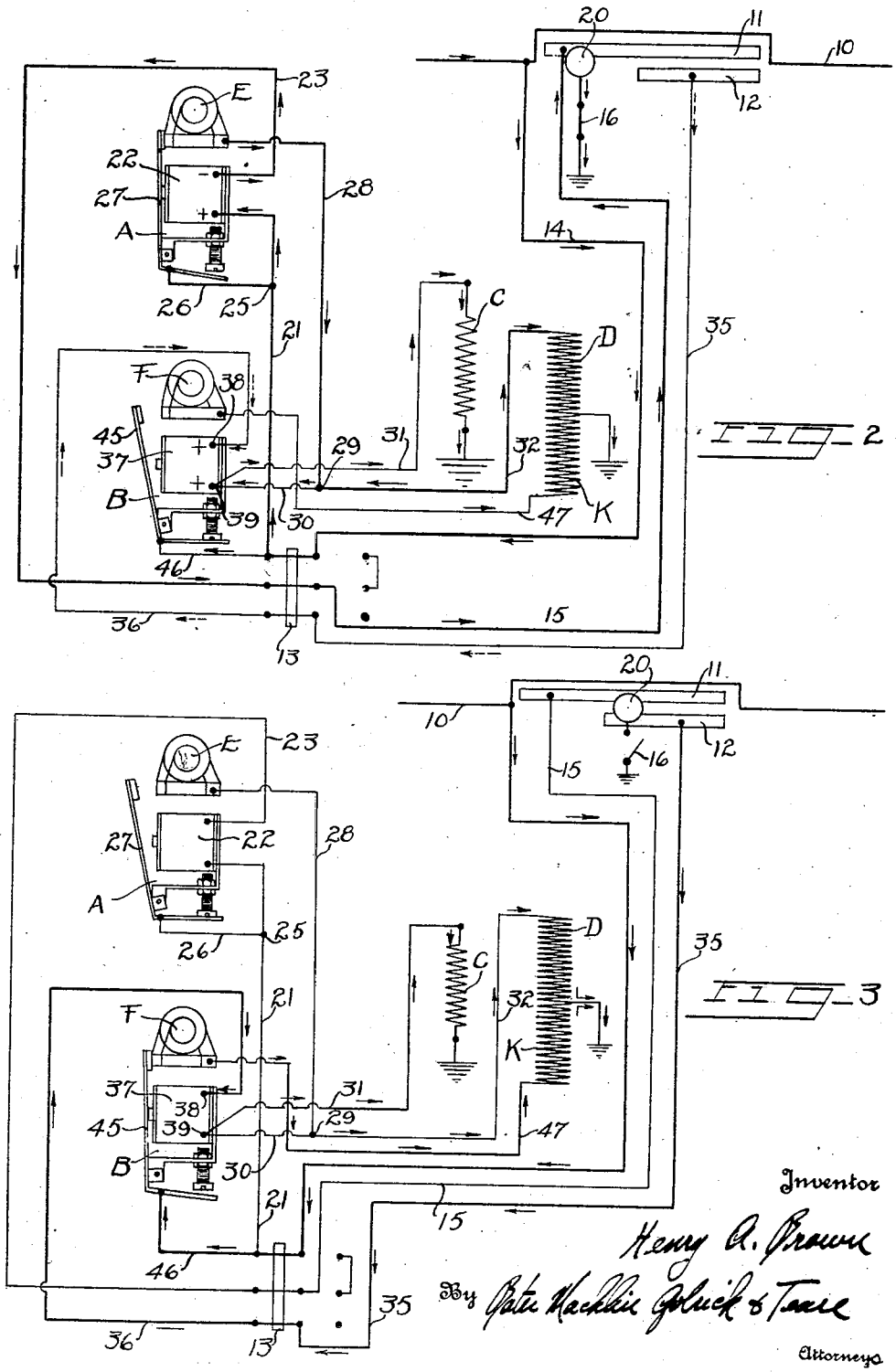

Patented Apr. 9, 1929.

1,708,691

UNITED STATES PATENT OFFICE.

HENRY A. BROWN, OF CLEVELAND, OHIO.

REMOTE CONTROL CIRCUIT CHANGER.

Application filed July 14, 1926. Serial No. 122,363.

This invention relates to remote control circuit changers which are adapted for use in connection with the operation of electric railway track switches. Such switches as commonly used, include a pan associated with the trolley wire, several relays with connections adapted to throw the switch point in one direction when the trolley wheel crosses the pan with power on, but to throw the switch point in the other direction when the wheel crosses the pan with power off.

One of the objects of the present invention is to provide a remote control circuit changer which eliminates the possibility of damage to the relay connections or other parts of the circuit in case the trolley wheel should enter the pan with power off, should stop and then should proceed under power. Another object of my invention is to greatly simplify the present arrangement of relays and circuit connections and to render the apparatus as nearly fool-proof as possible.

In the drawings, I have illustrated particularly in Fig. 1, a circuit arrangement embodying my invention wherein the master switch is set to prevent actuation of the track switches irrespective of the power condition existing in the car while the wheel passes across the pan; Fig. 2 is a wiring diagram illustrating the circuit arrangement with the master switch set to permit actuation of the track switch and illustrates the electrical condition existing when a trolley wheel passes the pan with power on; Fig. 3 is still another wiring diagram, but shows the electrical condition when the wheel enters the pan with power off.

In Fig. 1, 10 indicates the trolley wire with a pan associated therewith, the pan having the usual construction of a long iron 11 and a short iron 12. A master switch illustrated as a three pole double throw switch 13 functions to permit selective manual control of current and as shown in Fig. 1 the position of the switch prevents the current from entering any of the track switch actuating relays and accordingly whenever a trolley wheel enters the pan, current will merely flow through line 14, through switch 13, back through line 15 to the long iron 11 and thence to the ground through the motor connections indicated in general at 16. The switch 13 is usually mounted upon a pole near the track switch and is placed in the position shown in Fig. 1, principally while men are working upon the relays or whenever it is desired to maintain the track switch in position for a predetermined length of time.

In Figs. 2 and 3, I have shown a switch 13 thrown to the position for enabling the various relays to be actuated in accordance with the electrical condition of the car when the trolley wheel enters the pan. The apparatus which I employ to effect actuation of the track switches embodies a relay A and a relay B with a resistance unit C and a solenoid DK. The relays A and B have blowout coils indicated at E and F associated therewith. Briefly, the relay A is energized to the exclusion of the relay B under the power on condition to operate the portion D of the solenoid and to throw the track switch in one direction. On the other hand the relay B is energized to the exclusion of the relay A under the power off condition to energize the portion K of the solenoid to throw the track switch in the opposite direction.

Taking up first the power on condition as illustrated in Fig. 2 and assuming that the trolley wheel indicated at 20 has entered the pan, then current will flow through line 14, switch 13, line 21, through current coil 22 of the relay A, line 23, switch 13, line 15, iron 11, trolley wheel 20, car connections 16 to the ground. As soon as the coil 22 is energized, the relay A is picked up, hence current flowing through line 21 will divide at 25 and flow through line 26, armature 27, blow out coil E, line 28 to connection 29 where the paths for current will divide part of the current following the line 30 through line 31 and through resistance unit C to the ground and the major part following line 32 through the portion D of the solenoid and thence to ground to actuate the track switch point for the power on position.

Coil 22 may be wound to permit operation of the relay only when a current of about 25 amperes or more flows through the coil. The resistance unit C may have a resistance of about 1800 ohms while the resistance of the flow of current in the solenoid D or K may be about 64 ohms. It is to be understood that the values set forth are merely to show the general relation and that I do not care to be limited to any particular figures.

The current values in the portion D of the solenoid and the resistor C will be about in proportion to the inverse ratio of the resistance offered. In practice, the line voltage is about 600 volts and accordingly the solenoid portion D is so made that it may be satisfactorily actuated at this pressure. The blowout coils E and F may be of standard form and may be electrically connected in the circuit to function in the usual way to quench the arc in the event the relay switch is opened when a high current is flowing.

In Fig. 2, the trolley wheel is shown as being in electrical contact with the long iron 11 and out of electrical contact with the short iron 12. As soon as the trolley wheel 20 reaches the short iron, however, there will be positive potential on the short iron which will tend to create a flow through line 35, through switch 13, line 36 and through the coil 37 associated with the relay B. Accordingly, the terminal 38 on the coil will be raised to trolley potential but since the terminal 39 was previously raised to this same potential through the connection with the lines 28 and 39, the coil 37 is shunted out and the relay B is left open. The resistance unit C has such value that the current flow through it will be very small.

Taking up now the power off condition, that is, that the wheel enters the pan without current flowing through the car motors, then the relay B is actuated to the exclusion of the relay A. When the relay B is picked up, the solenoid portion K is actuated to throw the switch point in a direction opposite that assumed under the power on condition.

Tracing the circuit under the power off condition as shown in Fig. 3, full line voltage is impressed on line 14, line 21, coil 22, line 23, line 15, long iron 11, short iron 12, line 35, line 36, coil 37, which is then to be energized to pick up the armature 45. A ground is provided either through the resistor C or through solenoid portion D. As soon as the relay is picked up, then current can flow from the trolley wire 10 down through wire 14, switch 13, line 46, armature 45, through blowout coil F, line 47, thence through solenoid portion K to actuate the track switch in the directions opposite to that of the power on condition.

Under the power off condition, the relay A will not be energized because there is not sufficient current flowing through the coil 22 to pick up the relay A. For example, if the line voltage is 600 and if the resistance of the solenoid coils D and K is 64 ohms each, then the current flowing through the portion K of the solenoid is 600 divided by 64 or about 9.38 amperes. On the other hand, the resistance of the coil 37 may be about 750 ohms and the combined resistance of the resistor C and solenoid coil D being connected in parallel $$\frac{64 \times 1800}{64 + 1800} = \text{about 62 ohms.}$$

Accordingly, the total resistance in the circuit which includes the coil 37 is 750 plus 62 or 812 ohms plus the resistance of coil 22 and certain line and contact resistance. With a line pressure of 600, the current flowing through the coil 37, resistor C and coil D is therefore less than 600 divided by 812 or .74 amperes. The total current drawn for the entire circuit is 9.38 plus .74 amperes or 10.02 amperes. Inasmuch as a current of 25 amperes is required to actuate the coil 22 for picking up relay A and since less than .74 amperes flow through the coils 22 and 37, the relay A will not be actuated under the power off condition.

With the circuit arrangement embodied in my invention, if the trolley wheel were to enter the pan under the power on condition, the solenoid portion D will be actuated to throw the switch in one position. If the power should be thrown off before the wheel left the pan, the car might stop, while the wheel is in the pan, then the circuit arrangements would immediately be changed from circuits indicated by the heavy lines in Fig. 2 to that indicated by the heavy lines in Fig. 3. Accordingly, the switch would be thrown from the power on to the power off position, but inasmuch as it would be necessary to use power to proceed off the pan, then the switch would be thrown back to the power on position. The blowout coils E and F would prevent arcing at the relays, resulting in damage to the connections.

It will be seen from the foregoing description that I have provided a simple and positive arrangement for controlling a point thrower with the use of a minimum number of parts. In effect I provide a divided path from the trolley to the ground through separate halves of the solenoid coil. I place in each of these paths a relay both of which are normally open, but either of which may be closed and complete one path only. I then arrange the relay actuating coils in a circuit including the trolley wheel with one relay between the trolley wire and the trolley wheel and the other relay between the trolley wheel and the ground so that one relay only will be included in the car driving circuit. The other relay is designed to close in response to a small current flowing through both relays and the trolley wheel when the trolley wheel makes the circuit, but this relay is adapted to be shunted out whenever the first relay operates.

I claim:

1. In an electric switch operating device, the combination of a switch operating circuit comprising alternate paths for the switch operating current, relays controlling said paths, a circuit adapted to supply relay actuating current, means whereby a current of less than a predetermined amount can flow through both relays and actuate but one of them, and parallel paths to ground for said current, one in common with the switch operating circuit and another through an independent resistance unit.

2. In an electric switch operating device, the combination of a switch operating circuit comprising two separate paths for the switch operating current, a relay controlling each path and means whereby a current in excess of a predetermined amount may be passed through one of said relays independently of the other of said relays to actuate it, means for shunting out the last mentioned relay when the first relay is so actuated, and means for establishing the first relay circuit before establishing the second relay circuit.

3. The combination of a solenoid point thrower comprising two solenoid coils with a common ground, a trolley wire, a trolley wheel, contacts for said wheel adjacent said trolley wire, an independent ground connection, a solenoid operating circuit leading from the trolley to the said solenoid coils comprising divided paths, a second circuit, relays having coils in said second circuit for independently closing said paths, said relay coils being adapted to be arranged in series in said second circuit through the trolley wheel and said contacts, said second circuit when comprising the relay coils in series being grounded through one of the solenoid coils and through said independent ground connection in parallel therewith.

4. In a magnetic switch point thrower, the combination of a divided solenoid coil, adapted to throw the switch point, a ground connection therefor, a trolley wire, a trolley wheel adapted to lead current to a car, a long bar and a short bar positioned adjacent the trolley and adapted to contact with the trolley wheel, a relay connected in a circuit between the trolley wire and the long bar, a second relay connected in a second circuit between the short bar and the ground, armatures actuated by said relays, a third circuit including the armature for said first relay, the trolley wire and part of said solenoid coil, a fourth circuit including the armature of the second relay and leading from the trolley wire through the other part of said solenoid, and an auxiliary ground connection in said second circuit arranged in parallel with said solenoid ground connection.

5. A device according to claim 4 wherein the first relay closes before the second relay coil is energized when the resistance between the long bar and the ground is less than a predetermined amount and means for shunting out the second relay when the solenoid current flows in the direction determined by the action of the first relay.

6. An arrangement according to claim 4 wherein both relays are arranged in series between the trolley wire and the ground through the trolley wheel, the long bar and the short bar, and wherein the resistance of this series circuit is of such a value that the flow of current through both relay coils will be only enough to actuate one of them.

7. In a device according to claim 4 wherein the first and second circuits are connected in series from the trolley wire through the first relay, through the long bar, the trolley wheel, the short bar and the second relay to the ground whereby the current flowing from the trolley wheel through the car motors to the ground flows through the long bar and first relay before the trolley wheel contacts with the short bar.

8. In a magnetic switch point thrower, the combination of a divided solenoid coil having a common ground connection and adapted to throw a switch point, a trolley wire, a trolley wheel adapted to lead current to a car, a long bar and a short bar positioned adjacent the trolley and adapted to contact with the trolley wheel, relays for controlling the flow of current to the solenoid, a circuit including the trolley wire, a relay and the long bar, a second circuit including the short bar a second relay and parallel paths leading to the ground, one of said paths including a portion of the said solenoid coil, armatures actuated by said relays, a third circuit including the armature for said first relay, the trolley wire and having in common with the second circuit the said parallel paths to the ground including the said part of the solenoid coil, and a fourth circuit including the armature of the second relay and leading from the trolley wire through the other part of the solenoid coil.

9. In a magnetic switch point thrower, the combination of a divided solenoid coil having a common ground connection and adapted to throw a switch point, a trolley wire, a trolley wheel adapted to lead current to a car, a long bar and a short bar positioned adjacent the trolley and adapted to contact with the trolley wheel, relays for controlling the flow of current to the said solenoid coil, a resistance unit having a ground connection, a circuit including a relay and leading from the trolley wire to the long bar, a second circuit adapted to be put in series with the first circuit by the trolley wheel and leading from the short bar through a second relay to the ground through both a part of the solenoid coil and the resistance unit disposed in parallel so that if the solenoid coil be injured the second relay may have a ground connection for controlling a flow of current to the other portion of the solenoid coil and a circuit controlled by said second relay leading from the trolley through the other portion of said solenoid coil.

10. The combination of a trolley wire, a trolley pan comprising a long bar and a short bar, a trolley wheel adapted to contact with the long bar before contacting with the short bar, a switch point thrower including a solenoid coil, circuits leading from said trolley wire to said solenoid coil, relays in said circuits for determining the direction of flow of current in said coil, one of said relays associated with the long bar of the pan and the other of said relays associated with the short bar of the pan whereby current may flow to the first relay through the long bar and through the solenoid coil before a circuit is established for the second relay through the short bar.

11. A device for throwing a switch point comprising in combination a trolley wire, a trolley wheel, a pan including a long bar so arranged that the trolley wheel engages the long bar, a solenoid associated with the switch point, two leads extending from the trolley wire to the solenoid, two relays one disposed in each of said leads for separately controlling the flow of current to the solenoid and the direction of the flow of flux therein, one of said relays being directly connected to the long bar of the pan whereby it may be energized immediately upon contact between the trolley wheel and the long bar.

12. In a switch point thrower, the combination of a trolley wire, a trolley pan including a long bar, a solenoid for throwing the switch point, connections from the trolley wire to the solenoid, means controlling said connections which cause the solenoid to be energized to throw the switch point in one direction when a car crosses the pan with power on immediately upon engagement with the long bar, said switch point thrower including a short bar in the pan engaged by the trolley wheel after the trolley wheel engages the long bar, and means including the short bar for controlling the flow of current to said solenoid wherein the solenoid is not energized when the trolley wheel engages the long bar with power off and wherein the solenoid is energized to throw the switch point in the opposite direction when the trolley wheel engages the short bar with power off.

In testimony whereof, I hereunto affix my signature.

HENRY A. BROWN.